(12) United States Patent
Van Veen (10) Patent No.: US 9,565,025 B2
(45) Date of Patent: Feb. 7, 2017

(54) MEDIATION FOR PROVIDER-SPECIFIC IMPLEMENTATIONS OF ROAMING PROTOCOLS FOR MOBILE NETWORKS

(71) Applicant: Michael Jacobus Henricus Van Veen, Walldorf (DE)

(72) Inventor: Michael Jacobus Henricus Van Veen, Walldorf (DE)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 14/587,791

(22) Filed: Dec. 31, 2014

(65) Prior Publication Data

US 2016/0192175 A1    Jun. 30, 2016

(51) Int. Cl.
*H04L 12/14* (2006.01)
*H04L 12/26* (2006.01)
*H04W 8/12* (2009.01)
*H04W 8/02* (2009.01)

(52) U.S. Cl.
CPC ........... *H04L 12/1407* (2013.01); *H04L 43/18* (2013.01); *H04W 8/12* (2013.01); *H04W 8/02* (2013.01)

(58) Field of Classification Search
CPC .......... H04W 8/06; H04W 8/20; H04W 12/08; H04W 12/06; H04W 4/24; H04W 48/16; H04W 8/02; H04W 8/18; H04W 48/18; H04W 88/16; H04L 12/1407
See application file for complete search history.

(56) References Cited

U.S. PATENT DOCUMENTS

| | | | |
|---|---|---|---|
| 8,676,159 B1 * | 3/2014 | Shu | H04W 76/041 370/328 |
| 2012/0314632 A1 * | 12/2012 | Martinez De La Cruz | H04L 65/1046 370/310 |

* cited by examiner

*Primary Examiner* — Nam Huynh
(74) *Attorney, Agent, or Firm* — Brake Hughes Bellermann LLP (57) ABSTRACT

A message handler may receive, for a roaming user within a visited network of a visited mobile service provider, a message in accordance with a first roaming protocol implementation of the visited mobile service provider, and may identify, from a mediation repository, a relationship between the first roaming protocol implementation of the visited mobile service provider and a second roaming protocol implementation of a home mobile service provider of which the roaming user is a subscriber. A packet inspector may determine, from the relationship, that the message requires modifications in order to comply with the second roaming protocol implementation, and a packet modifier may then modify the message to ensure compliance with the second roaming protocol implementation.

18 Claims, 8 Drawing Sheets

MEDIATION FOR PROVIDER-SPECIFIC IMPLEMENTATIONS OF ROAMING PROTOCOLS FOR MOBILE NETWORKS

TECHNICAL FIELD

This description relates to roaming protocols for mobile networks.

BACKGROUND

Mobile networks enable enormous quantities of wireless communications between many different types of mobile devices, and provide various types of services. Typically, the mobile networks are provided (e.g., owned, or leased) by mobile service providers, also known as carriers, mobile network operators (MNOs), or just as service providers, each of which maintains a number of subscribers. The subscribers of a given service provider have corresponding fee arrangements with their respective service provider, and, in return, are provided with access to the mobile network (and associated network resources) of the service provider, along with, e.g., various associated features, services, and devices provided by the service provider.

From a business perspective, then, the various service providers are in competition with one another, and seek, e.g., to increase their subscribers base (including winning subscribers from another service provider), provide value in the way of available services, service reliability, or service availability, or otherwise to increase profitability and competitive advantage. Nonetheless, for various technical, governmental, and/or business reasons, it is often necessary for the various service providers to cooperate with one another to some extent. For example, virtually all service providers have agreed to certain technical standards for implementing wireless communications, where such standards are typically updated or changed over time in a generally cooperative manner.

In related examples, a given service provider may provide mobile network resources in certain geographical areas, while another service provider provides mobile network resources in other geographical areas. Subscribers of both service providers will typically wish to have an option of using their subscription services (e.g., being able to make a telephone call, or access the Internet), even when travelling in the geographical area of the competing service provider. Therefore, it is to the advantage of each service provider to agree with the other to provide services to visiting subscribers. Such scenarios are generally known as roaming scenarios, i.e., the visiting subscribers are considered to be roaming outside of their home network, and within a geographical or other domain of a visited network.

Unfortunately, it is often difficult to enable desired communications between a visited network and a subscriber's home network in an efficient, scalable, cost-effective manner. For example, even though various technical standards have been developed to enable mobile communications, and even to enable inter-provider communications including basic roaming scenarios, it remains difficult to enable roaming scenarios in a way that facilitates subscriber desires, enhances service provider profitability and reputation, and minimizes resources of the various individual service providers during implementation of the roaming scenarios. In particular, although standard roaming protocols have been defined for enabling certain roaming scenarios, a given service provider may implement or extend a standard roaming protocol in a way that is not consistent with, or contemplated by, the base or existing version thereof.

In other words, provider-specific implementations or extensions of otherwise standard roaming protocols may be used that, while acceptable within a domain of the provider in question, may trigger an error or other malfunction when communicating with a mobile network of a different service provider during a roaming scenario. As a result, for example, roaming subscribers may be deprived of various services. Moreover, service providers may find it difficult to deploy and balance network resources efficiently, and/or may not have the knowledge or ability to invoice subscribers for services provided in roaming scenarios. Thus, service providers may suffer from decreased subscriber satisfaction and/or lost opportunities for profit.

SUMMARY

According to one general aspect, a computer program product may be tangibly embodied on a non-transitory computer-readable storage medium and may comprise instructions that, when executed, are configured to cause at least one processor to receive, for a roaming user within a visited network of a visited mobile service provider, a message in accordance with a first roaming protocol implementation of the visited mobile service provider, and identify, from a mediation repository, a relationship between the first roaming protocol implementation of the visited mobile service provider and a second roaming protocol implementation of a home mobile service provider of which the roaming user is a subscriber. The instructions, when executed, may further cause the at least one processor to determine, from the relationship, that the message requires modifications in order to comply with the second roaming protocol implementation, and modify the message to ensure compliance with the second roaming protocol implementation.

According to another general aspect, a computer-implemented method for executing instructions stored on a non-transitory computer readable storage medium may include receiving, for a roaming user within a visited network of a visited mobile service provider, a message in accordance with a first roaming protocol implementation of the visited mobile service provider, and identifying, from a mediation repository, a relationship between the first roaming protocol implementation of the visited mobile service provider and a second roaming protocol implementation of a home mobile service provider of which the roaming user is a subscriber. The computer-implemented method may further include determining, from the relationship, that the message requires modifications in order to comply with the second roaming protocol implementation, and modifying the message to ensure compliance with the second roaming protocol implementation.

According to another general aspect, a system may include at least one processor, and instructions recorded on a non-transitory computer-readable medium, and executable by the at least one processor. The system may include a message handler configured to cause the at least one processor to receive, for a roaming user within a visited network of a visited mobile service provider, a message in accordance with a first roaming protocol implementation of the visited mobile service provider, and further configured to cause the at least one processor to identify, from a mediation repository, a relationship between the first roaming protocol implementation of the visited mobile service provider and a second roaming protocol implementation of a home mobile service provider of which the roaming user is a subscriber. The system may further include a packet inspector configured to cause the at least one processor to determine, from the relationship, that the message requires modifications in order to comply with the second roaming protocol implementation, and a packet modifier configured to cause the at least one processor to modify the message to ensure compliance with the second roaming protocol implementation.

The details of one or more implementations are set forth in the accompanying drawings and the description below. Other features will be apparent from the description and drawings, and from the claims.

DETAILED DESCRIPTION

Figure 1:
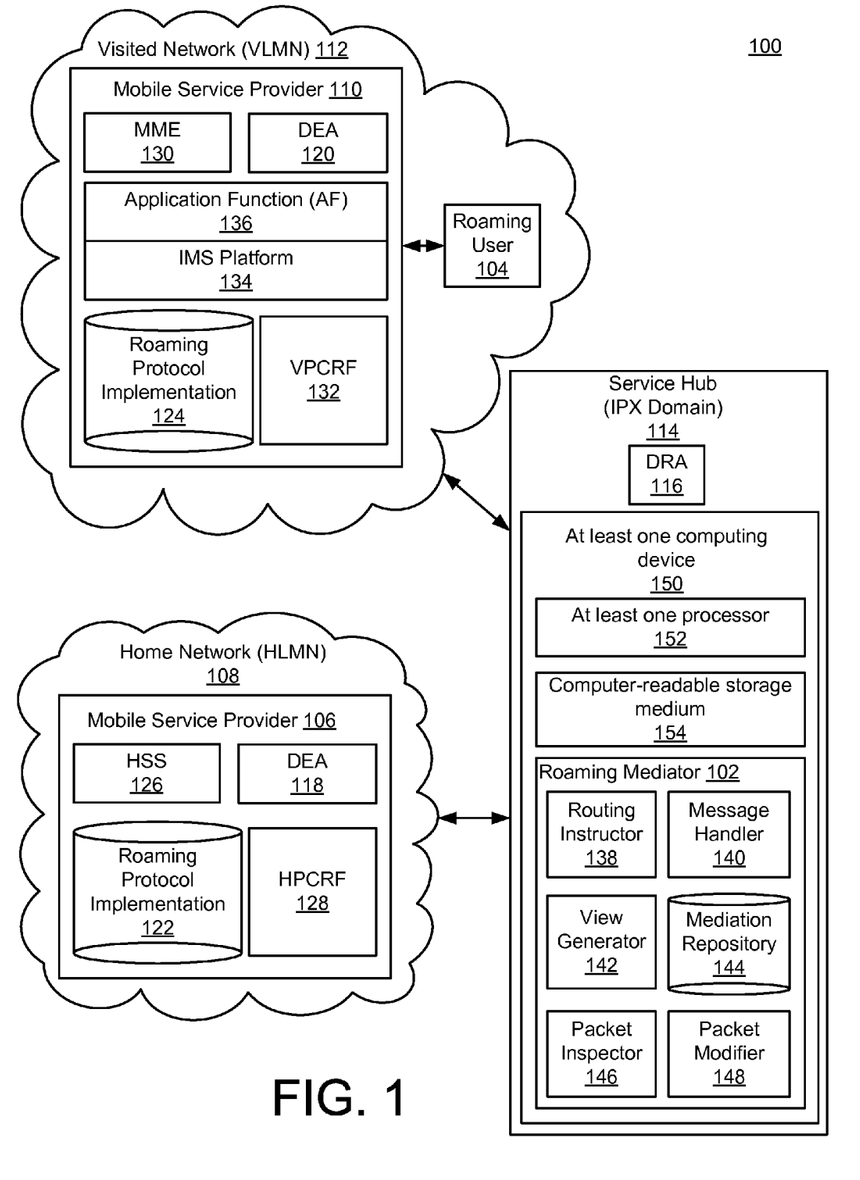
FIG. 1 is a block diagram of a system for mediation of provider-specific implementations of roaming protocols for mobile networks.

FIG. 1 is a block diagram of a system 100 for mediation of provider-specific implementations of roaming protocols for mobile networks. In the example of FIG. 1, a roaming mediator 102 is configured to facilitate the providing of wireless communications services to an example roaming user 104, who is assumed to be a subscriber of a mobile service provider 106. As shown, the mobile service provider 106 implements a home network 108 (for the roaming user 104), while the roaming user 104 is currently located in a geographical region that is outside of the home network 108 but inside a geographical region of a mobile service provider 110 implementing a visited network 112. In other words, the roaming user 104 is roaming, and requiring wireless services to be provided (or facilitated) by the mobile service provider 110 within the visited network 112.

In various roaming scenarios represented by the simplified example of FIG. 1, as explained in detail below, the mobile service provider 106 of the home network 108 is assumed to have knowledge of a subscription status of the roaming user 104, including subscribed-to services, fee arrangements, quality of service agreements, and authentication information (e.g., codes identifying a Subscriber Identification Module (SIM) card of the roaming user 104, and associated user contract and associated, enabled services). The mobile service provider 110 of the visited network 112 does not initially have such information, because the roaming user 104 is not a subscriber. Therefore, roaming protocols have been developed which enable the exchange of such information between the mobile service providers 106, 110. Moreover, such roaming protocols enable at least rudimentary techniques for allowing the mobile service provider 110 to provide desired, authorized services to the roaming user 104 on behalf of the mobile service provider 106 of the home network 108.

One such roaming protocol is known as the Remote Authentication Dial In User Service (RADIUS). A second example roaming protocol is known as Diameter, which is a protocol developed as an upgrade to RADIUS, and which was named not as an acronym, but as a play on words with the implication that the Diameter protocol would be twice as good as the RADIUS protocol, just as a Diameter is twice the radius of a circle. In the following examples, it is assumed that Diameter is used as the roaming protocol between the service providers 106, 110, in order to provide specific example implementation details. Of course, it will be appreciated that the system 100 of FIG. 1 may use any appropriate roaming protocol, including advancements of Diameter as well as entirely new and/or yet-to-be developed roaming protocols.

Known roaming scenarios, as well as other inter-operator communication scenarios, rely on a service hub 114. Service hubbing is well-established, and based on the principle that it is preferable to establish only one connection in order to reach many different destinations, as opposed to establishing many different one-to-one connections. For example, although only two mobile service providers 106, 110 are illustrated in FIG. 1, it will of course be appreciated that many different service providers may exist, each providing wireless communication services to its subscriber base, and each wishing to participate in inter-operator communications. In such scenarios, the use of the service hub 114 provides a number of advantages, such as a reduction of set-up and testing times, as well as a resulting reduction in time-to-market of provided services.

In order to establish such interconnectivity between a plurality of service providers, including the mobile service providers 106, 110, and including the exchange of signaling and user plane traffic with roaming partners, the service hub 114 may be used as part of an Internet Protocol (IP) eXchange (IPX), which is a well-known network interconnection model developed by the Group Special Mobile (GSM) Association, or GSMA. The use of the service hub 114 in the IPX domain provides for an alternative to the public Internet in enabling basic service provider interoperability.

As just mentioned, the present description primarily contemplates the use of the Diameter protocol, so that the service hub 114 is illustrated as including a Diameter routing agent (DRA) 116. The DRA 116 communicates with a Diameter edge agent (DEA) 118 at the mobile provider 106 of the home network 108, as well as with a DEA 120 at the mobile service provider 110 of the visited network 112. As described in detail below, the DRA 116 and DEAs 118, 120 illustrate the use of Diameter to facilitate hubbed communications between a number of service providers, including the mobile service providers 106, 110.

For example, outside of a strict roaming scenario, it may occur that a subscribing user of the mobile service provider 106 in the home network 108 wishes to send a message (e.g., a text message, or a phone call) to a subscribed user of the mobile service provider 110 in the visited network 112 (which would of course be the home network from the point of view of the subscribed user of the mobile service provider 110). Such communications include basic inter-operator interactions that may represent a huge volume of data flow, including a number in the billions in terms of messages exchanged and routed by the service hub 114.

Thus, the Diameter protocol may be used to facilitate such inter-provider communications, as well as the type of roaming scenarios referenced above and described in detail, below, so that roaming traffic generally represents only a portion of the entirety of data traffic processed by the service hub 114. In other words, although the Diameter protocol is referred to herein as a roaming protocol, and used in that sense as a representative example of multiple types of roaming protocols that may be used, it will be appreciated that the Diameter protocol has other well-known features that are not necessarily described herein in detail, except as may be necessary or helpful in understanding operations of the system 100 of FIG. 1.

In this context, FIG. 1 illustrates that the mobile service provider 122 utilizes a roaming protocol implementation 122, while the mobile service provider 110 implements a roaming protocol implementation 124, which may be different in form and function. Specifically, with reference to the Diameter protocol as an example, the Diameter base protocol is specified by the Internet Engineering Task Force (IETF), but many possible extensions or variations of the base protocol are possible. By way of simplified example, the two implementations 122, 124 may format representations of dates differently (e.g., month/day/year, as opposed to year/month/day), or may otherwise take different approaches to formatting otherwise-standard data. In other examples, the implementations 122, 124 may use (or not use) certain optional fields (e.g., the Vendor ID field), or may implement the same fields but with different lengths of data therein.

More detailed examples of such differences in roaming protocol implementations 122, 124 are provided, below. In general, though, it will be appreciated that in standard situations in which a potentially large number of service providers are serviced by the system 100 of FIG. 1, each such service provider may have its own implementation of the relevant roaming protocol. Therefore, the roaming mediator 102 is configured to mediate between these various different implementations, for each pair of service providers engaged in a particular interaction. Consequently, the individual service providers are not required to modify their individual implementations of the roaming protocol, and instead can effectively outsource such modifications to the roaming mediator 102.

In the example of FIG. 1, it is assumed that the illustrated mobile service providers 106, 110 are implementing an IP environment for providing Long Term Evolution (LTE)/4G services to their various subscribers, and roaming users. As is well-known, such LTE/4G services refer to industry-wide advancements over the earlier $3^{rd}$ Generation (3G) standard, in which different frequency spectrums and digital signal processing techniques enable faster, higher volumes of data traffic, along with previously-unavailable services, such as IP-based video calling, IP-based video streaming, high definition (HD) voice, and generally-improved Internet access. Of course, LTE/4G also provide IP-based equivalents of standard services, such as voice calls and text messaging, but using packet-switched connections instead of earlier circuit-switched connections.

For purposes of explaining operations of the roaming mediator 102 in greater detail, the mobile service providers 106, 110 are illustrated as containing a number of additional, otherwise-standard components. Specifically, the mobile service provider 106 is illustrated as including a Home Subscriber Service (HSS) 126, which is essentially a listing of all subscribing users, along with associated fee and service arrangements (e.g., quality of service requirements, volume of data permitted per month, and roaming privileges and associated costs). The mobile service provider 106 is also illustrated as including a Home Policy and Charging Rules Functions (H-PCRF) 128, which implement associated services in conjunction with the HSS 126.

Meanwhile, the mobile service provider 110 is illustrated as including a mobility management entity (MME) 130, along with a Visitor PCRF, or VPCRF, 132. Generally speaking, the MME is used to install subscription information for the roaming user 104 from the HHS 126, in order to provide roaming services therefor.

In other words, it is assumed that the roaming user 104 is a subscribing user of the mobile service provider 106 acting as the home service provider and storing subscription information for the roaming user 104 in the HHS 126, where such subscription information is routinely used to provide services to the roaming user 104 when the roaming user is not roaming and is located within the home network 108. When the roaming user 104 is currently roaming in the visited network 120, the DEA 120 communicates with the DRA 116 and thus the DEA 118, in order to obtain relevant subscription information for the roaming user 104 from the HSS 126. Then, the subscription information can be installed temporarily on the MME 130, so that, for example, the VPCRF 132 can proceed to implement allowed services as specified within the MME 130.

Thus, the Diameter protocol, in the context of enabling roaming, enables authentication, authorization, and accounting (AAA) for the roaming user 104. That is, the Diameter protocol, acting through the DEAs 118, 120 and the DRA 116, authenticates the roaming user 104 as a subscriber of the mobile service provider 106, verifies authorization of the roaming user 104 to use a requested service(s), and accounts for associated services and costs actually provided to the roaming user 104. Other related functionalities may include location updates, specifying a current location of the roaming user 104 within the visited network 112, which may impact services provided and/or which may necessitate transitioning the roaming user 104 to a separate MME (not shown) of the mobile service provider 110.

Further in FIG. 1, the mobile service provider 110 is illustrated as including an IP Multimedia Subsystem (IMS) platform 134, which is shown as providing a foundation for an illustrated application function (AF) 136. In general, the IMS platform 134 represents a known, standardized, architectural framework for providing mobile IP services, originally developed by the wireless standards body $3^{rd}$ Generation Partnership Project (3GPP). As such, the IMS platform 134 may be used to provide a number of applications and associated application functions, such as the AF 136. Specifically, for example, the IMS platform 134 may provide session-based access to an application such as those referenced above (e.g., calling, messaging, or video calling).

As already referenced, the various contents of the mobile service providers 106, 110 are illustrated and described as standard components that are well-known and widely implemented, and are not described in detail herein except as may be necessary or helpful in understanding operations of the system 100 of FIG. 1, including the roaming mediator 102. Indeed, an advantage of the roaming mediator 102 is that few or no changes to such standard components are required in order to implement the system 100 of FIG. 1. Nonetheless, the mobile service providers 106, 110 are illustrated and described in detail in order to provide example context for operations of the roaming mediator 102.

Of course, in actual implementations of the system 100 of FIG. 1, various modifications may be made. For example, modified or otherwise non-standard components designed to facilitate operations of the roaming mediator 102 may be implemented at the mobile service provider(s) 106, 110. In other examples, as described and illustrated below with respect to FIGS. 3-5, the roaming mediator 102 may be implemented separately from the service hub 110 and/or the DRA 116.

Moreover, in the example of FIG. 1, the mobile service providers 106, 110 are assumed to represent generic service providers in the realm of mobile wireless communications, each implementing respective networks 108, 112. In the example, the home network 108 is illustrated as a Home Land-based Mobile Network (HLMN) 108, while the visited network 112 is illustrated as a Visited Land-based Mobile Network (VLMN). Of course, various other types of service providers and associated networks may be utilized. For example, the networks 108, 112 may represent physical, separate networks, or may represent separate virtual networks implemented using (at least partially) the same underlying physical network(s). Further, as referenced above and illustrated in detail below with respect to FIGS. 3-5, the visited network 112 may serve as a home network for its own subscriber base when its subscribers are roaming (e.g., may contain its own HSS, not illustrated), while, conversely, the home network 108 may serve as a visited network for the subscriber base of the mobile service provider 110 when subscribers of the latter are roaming (e.g., may contain its own MME, not illustrated).

With the above context, and as explained in detail below, the roaming mediator 102 enables various types of mediated communications over the, e.g., Diameter protocol, even when the service providers 106, 110 each have different roaming protocol implementations 122, 124. In particular, for example, the roaming mediator 102 enables the installation of Quality of Service (QoS) rules and Policy and Charging Control (PCC) rules from the home network 108 onto the visited network 112, as specified and implemented using the HPCRF 128 and the VPCRF 132, in order, e.g., to ensure that the roaming user receives a paid-for level of service quality. Further, for example, the roaming mediator 102 enables the exchange of application level session information between the HPCRF 128 in the home network 108 and the AF 126 in the visited network 112, in order to thereby provide the application function to the roaming user 104.

In operation, the roaming mediator 102 utilizes a routing instructor 138 that is configured to instruct the DRA 116 and/or other components of the service hub 114 to route Diameter packets potentially requiring mediation to the mediator 102. In other words, as described in detail herein, the DRA is responsible for high-speed, high-volume routing of communications and data among many different service providers, many of which will not require or benefit from mediation by the roaming mediator 102. The routing instructor 138 instructs the DRA 116 as to which packets should be removed from this large stream of data and routed to the roaming mediator 102.

Figure 6:
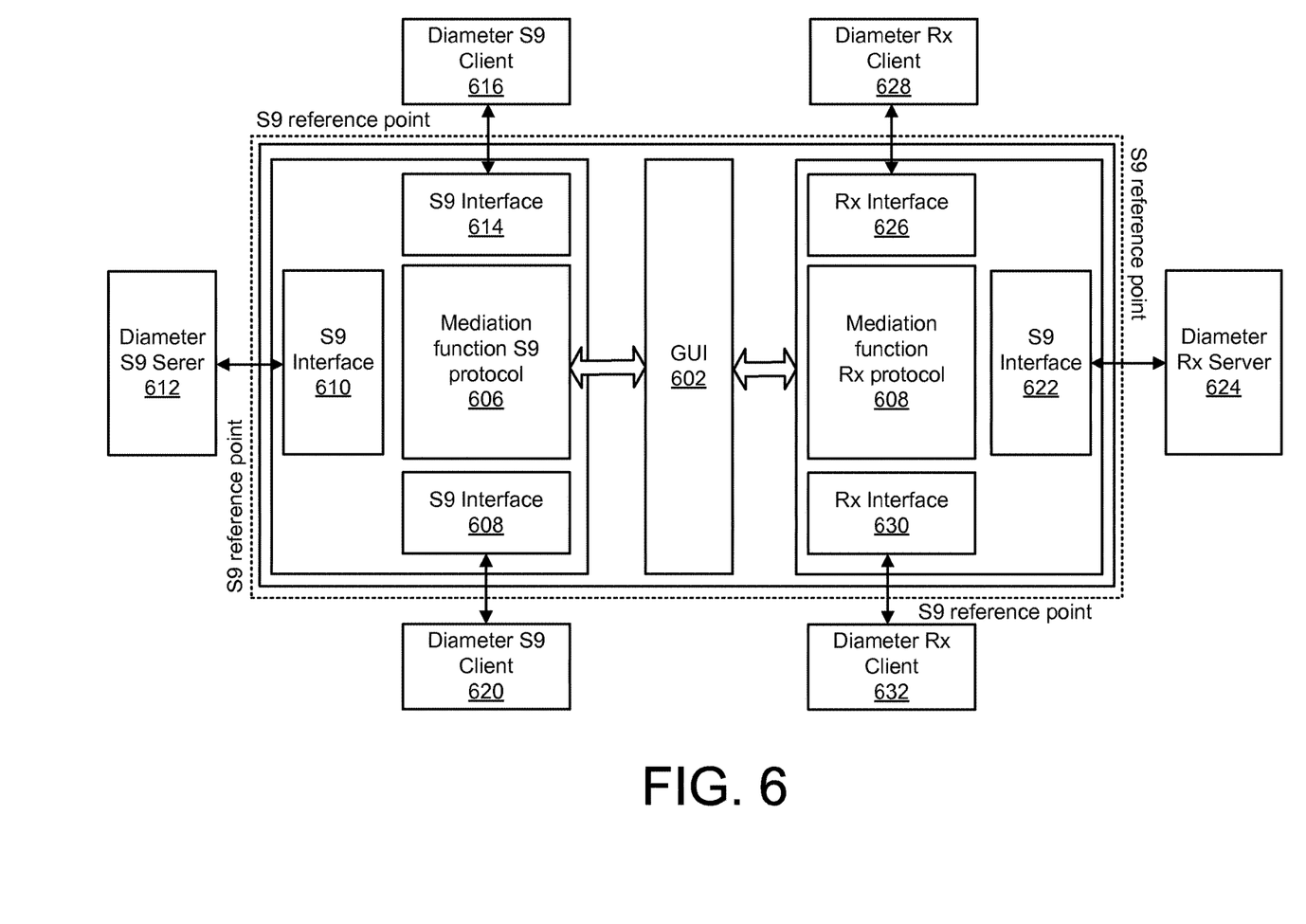
FIG. 6 is a block diagram of a configuration scenario for configuring aspects of the system of FIG. 1

In accordance with such routing instructions, a message handler 140 then receives the messages or other communications routed to the roaming mediator 102 from the DRA 116 during normal routing operations thereof. Operations of the routing instructor 138 and the message handler 140 may be governed through the use of a graphical user interface (GUI), illustrated and described in more detail below with respect to FIG. 6, provided by a view generator 142. Such a GUI also may be used to configure contents of a mediation repository 144, which specifies details for each of the various pairs of service providers among whom mediation may be required.

Then, during operation, a packet inspector 146 receives messages for mediation from the message handler 140. Based on the mediation repository 144, the packet inspector 146 may identify which, if any, fields of received packets may require modification. That is, for example, the mediation repository 144 may specify that for the specific pair of service providers 106, 110 (and associated roaming protocol implementations 122, 124), a specific field may require modification (e.g., a change in format, length, or inclusion/exclusion of particular content and/or type of field). For a given message, however, such a mediation may not be relevant, since, for example, the specific field may not be included in the specific message received. In such cases, the message may be routed as normal by the DRA 116.

In other scenarios, of course, the received message may be determined by the packet inspector 146 to require a modification to a specific, included field. Then, a packet modifier 148 may be used to modify a content of a field or other aspect of the identified packet. Afterwards, again, the (now modified) packet may be forwarded in a normal fashion by the DRA 116.

In this way, the roaming mediator 102 enables the mobile service providers 106, 110 to maintain their individual, respective roaming protocol implementations 122, 124. That is, without the roaming mediator 102, the mobile service provider 110 would be unable to communicate with the mobile service provider 106 in providing a full range of potential roaming services to the roaming user 104. Moreover, even if the, e.g., mobile service provider 110, were to modify its roaming protocol implementation 124 to facilitate interaction with the mobile service provider 106, such modification would not necessarily or likely enable similar interactions with other service providers. In contrast, again, the roaming mediator 102 enables all such interactions, without requiring modifications to the individual roaming protocol implementations 122, 124.

As referenced above, and described in detail below with respect to FIGS. 3-5, the roaming mediator 102 may be implemented at the service hub 114, or may be implemented separately therefrom. In the example of FIG. 1, the roaming mediator 102 is illustrated as being implemented using at least one computing device 150, which itself includes at least one processor 152, and non-transitory computer readable storage medium 154. Of course, the at least one computing device 150 will be understood to have many other standard features and components, but the simplified illustration of FIG. 1 is intended merely to demonstrate implementation of the roaming mediator 102 through the execution of corresponding instructions stored using the non-transitory computer readable storage medium 154 by the at least one processor 152.

In some implementations, the mediator 102 may be executed using two or more computing devices in communication with one another. For example, the roaming mediator 102 is illustrated as including a number of example components 138-148. In various implementations, some of the various components 138-148 may be implemented using the first computer, while remaining ones of the components 138-148 may be implemented using a separate computer. More generally, it will be appreciated that, in various implementations, any one of the various components 138-148 may be implemented as two or more subcomponents, while, conversely, in other implementations, any two or more of the components 138-148 may be combined for implementation as a single component.

Figure 2:
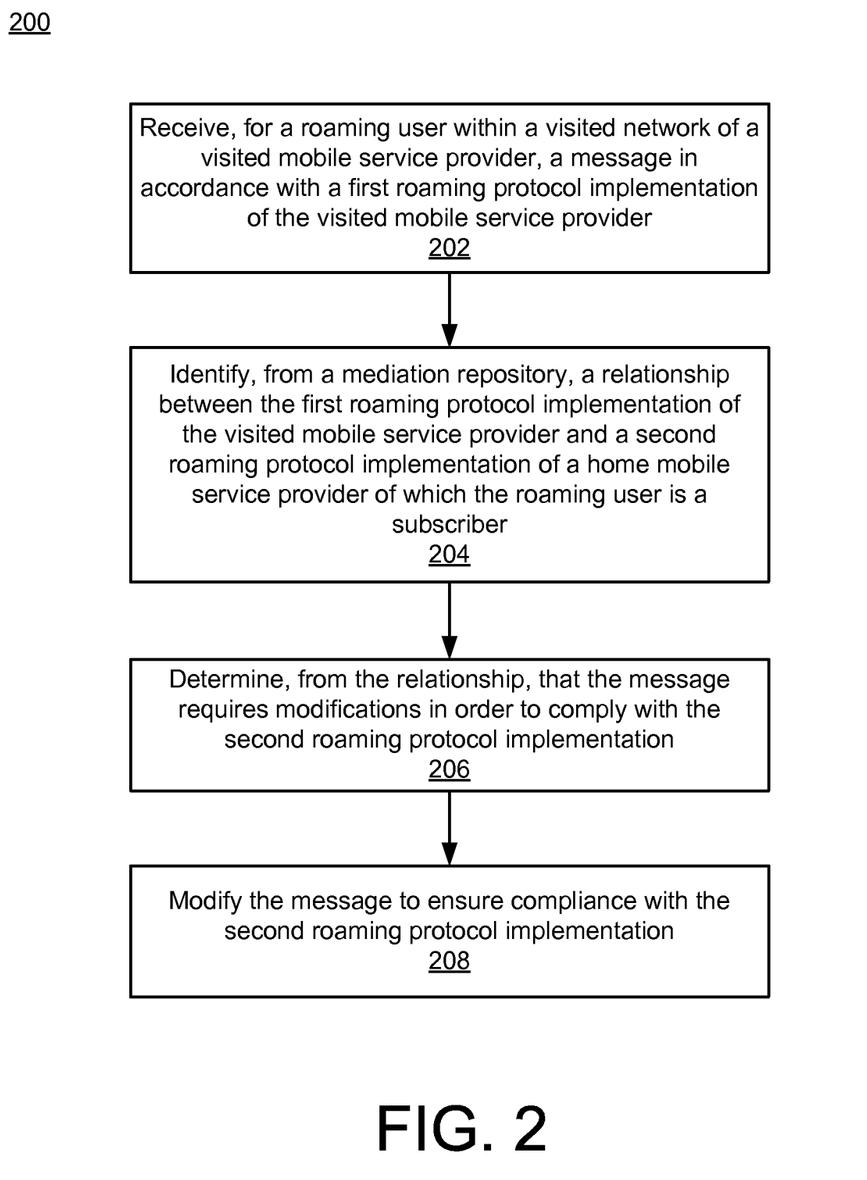
FIG. 2 is a flowchart illustrating example operations of FIG. 1.

FIG. 2 is a flowchart 200 illustrating example operations of the system 100 of FIG. 1. In the example of FIG. 2, operations 202-208 are illustrated as separate, sequential operations. In various implementations, additional or alternative operations may be included, and/or one or more of the operations 202-208 may be omitted. In all such implementations, it will be appreciated that any two or more such operations, or sub-operations, may be performed in a partially or completely overlapping or parallel manner, or in a nested, iterative, looped, or branched fashion.

In the example of FIG. 2, for a roaming user within a visited network of a visited mobile service provider, a message may be received in accordance with a first roaming protocol implementation of the visited mobile service provider (202). For example, the message handler 140 of the roaming mediator 102 may receive, from the DRA 116 and based on routing instructions received from the routing instructor 138, a message received by the mobile service provider 110 from the roaming user 104. As referenced, a message including Diameter packets formatted and structured in accordance with the roaming protocol implementation 124. For example, as referenced above, and described in more detail below, such a message may include an actual message and associated content received from the roaming user 104 (i.e., from a mobile device of the roaming user 104), and/or may represent any type of roaming-related communication designed to provide the roaming user 104 with correct and appropriate services to which the roaming user 104 is entitled, notwithstanding the current presence of the roaming user 104 within the visited network 112.

From a mediation repository, a relationship between the first roaming protocol implementation of the visited mobile service provider and a second roaming protocol implementation of a home mobile service provider of which the roaming user is a subscriber may be identified (204). For example, the message handler 140 may inspect the mediation repository 144 to determine a relationship, if any, between the mobile service providers 108, 110 (e.g., more specifically, between their respective roaming protocol implementations 122, 124). For example, as referenced above, the mediation repository 144 may be used to store and characterize pairs of mobile service providers, such as the mobile service provider 106 and the mobile service provider 110. Then, the message handler 140 may retrieve the appropriate pair of mobile service providers for a given received message, along with corresponding mediation data characterizing a manner in which the message may need to be modified.

From the relationship, it may be determined that the message requires modification in order to comply with the second roaming protocol implementation (206). For example, as just referenced, the packet inspector 146 may be configured to analyze Diameter packets of the message in question, in order to determine whether any such packet corresponds to packets identified as requiring by the mediation repository 144.

Thus, the message may be modified to ensure compliance with the second roaming protocol implementation (208). For example, the packet modifier 148 may modify specific pieces and types of content of the message in question, in order to comply with the roaming protocol implementation 122 of the mobile service provider 106.

Figure 3:
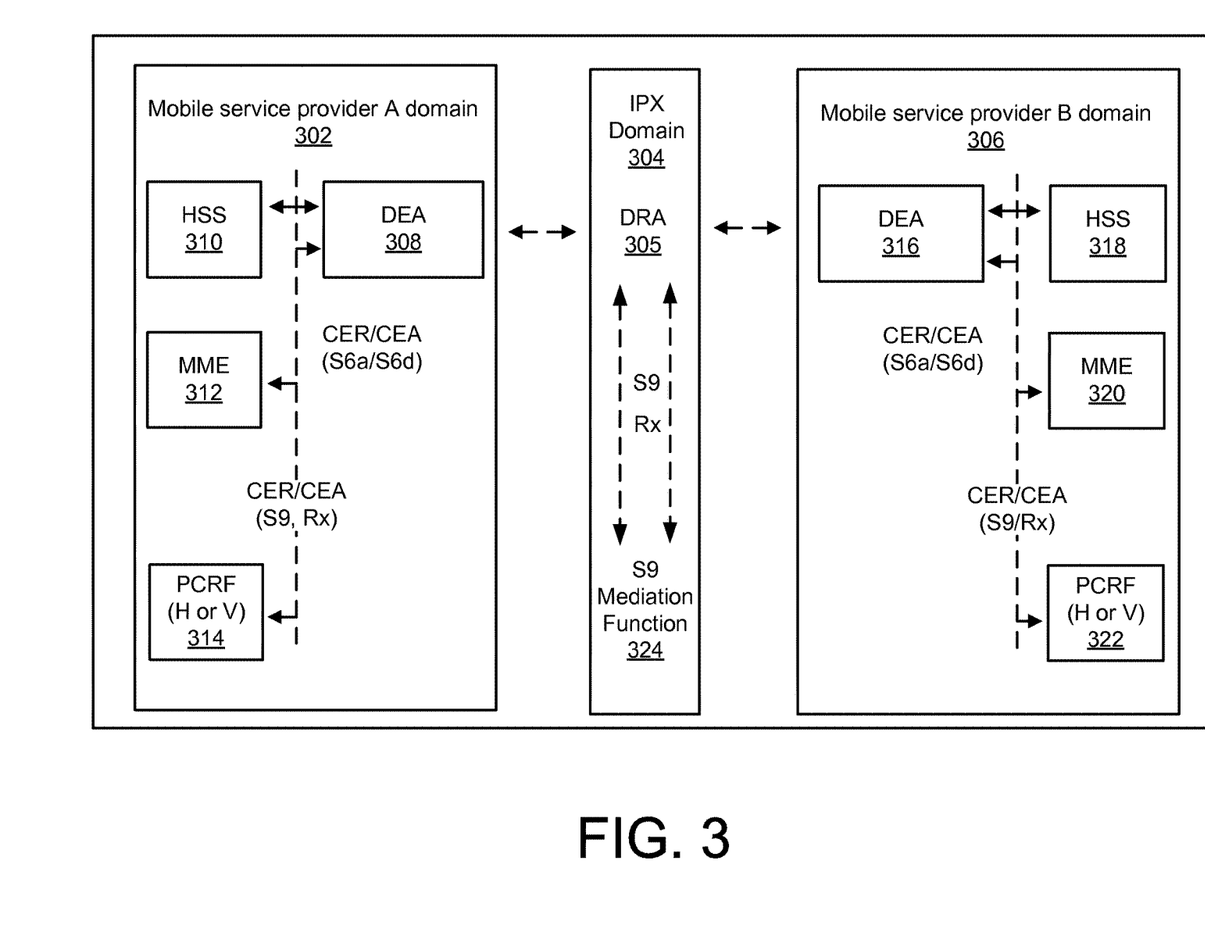
FIG. 3 is a block diagram of a first example implementation of the system of FIG. 1.

FIG. 3 is a block diagram of a more detailed example implementation of the system 100 of FIG. 1. In the example of FIG. 3, it is assumed that the Diameter protocol is being use to enable roaming in LTE/4G networks. As is known, the Diameter protocol, and various portions thereof, are used extensively in various mobile roaming scenarios. However, for the sake of simplification and example, FIG. 3, as well as FIGS. 4, 5, and 6, LTE roaming architecture models use Diameter across just two reference points, S6 and S9, and the following descriptions are provided in conjunction therewith. Of course, such examples are merely for the sake of clarification and explanation, and are not intended to be limiting in any way.

By way of further background, and for the sake of understanding the following examples, the term reference point should be understood to represent a well-known industry-standard term that refers generally to a network path between two or more specific network components, along with associated interfaces and any intervening network components, if any. In the context of the LTE roaming architecture described and illustrated below with respect to FIGS. 3-5, the S6 reference point refers to a reference point at which the Diameter protocol is used to exchange AAA information and location update between the HSS 126 and the home network 108 and the MME 130 in the visiting network 112. As is known, the use of Diameter across the S6 reference point is transaction-based, as compared to the session-based use of Diameter described below. In two examples, the S6 reference point may be implemented as the known S6a reference point for pure LTE roaming, or S6 d for roaming on legacy networks.

Thus, in the example of FIG. 3, a mobile service provider 302 represents a first mobile service provider domain, serviced by an IPX domain 304 that is also in communication with a mobile service provider 306 within a corresponding mobile service provider domain. As may be understood from the above description of the GRA 116 of FIG. 1, the IPX domain 304 may include a DRA 305 in communication with a DEA 308 of the mobile service provider 302 and a DEA 316 of the mobile service provider 306. As also described above, the primary function of the DRA 305 is to route large volumes of Diameter traffic between networks of the mobile service providers 302, 306, along with normalizing differences and implementation of the Diameter agents 308, 316.

In this way, for example, as referenced above with respect to FIG. 1, the HSS 310 may be accessed to install corresponding subscriber information within the MME 320 for a roaming user within the illustrated domain of the mobile service provider 306. Of course, although not specifically illustrated and described with respect to FIG. 1, the mobile service provider 306 may itself contain its own HSS 318, which may be utilized to install subscriber information on an MME 312 of the mobile service provider 302 during scenarios in which a roaming user of the mobile service provider 306 is located within the domain of the mobile service provider 302. In conjunction with associated authenticating, authorizing, and accounting activities facilitated by the DRA 305, capability exchange messages may be sent from the home network to the visiting network. For example, as shown, a capability exchange request (CER) and/or a capability exchange answer (CEA).

Meanwhile, the reference point across which the PCRF in the home network (e.g., the PCRF 314) exchanges Diameter traffic with its counterpart (PCRF 322) may be referred to as the S9 reference point. As with the just-described S6 reference point, Diameter traffic of the S9 reference point can also be routed by way of the DRA 305.

Two examples of Diameter applications running over the S9 reference point include the S9 protocol and the Rx protocol. The S9 application and the Rx application are both session-based protocols. It will be appreciated that, as is known within the relevant industry, the identifier S9 may be used to refer to the S9 reference point, while the S9 protocol, just described, should be understood to represent a protocol running on the S9 reference point.

With regard to the S9 Diameter protocol, the home PCRF (e.g., 314) and the visited PCRF (e.g., 322) act as a server-client pair. A primary purpose of S9 is to install PCC or QOS rules generated in the HPLMN into the VPLMN, and to transport events that may occur in the visited network back to the home network.

Meanwhile, the Rx protocol may be used, for example, in scenarios known as "visited access," or "local breakout," in which, e.g., a mobile device of a roaming user is registered on an IMS (more specifically, the application function AF) in the VPLMN, rather than on the AF in the HPLMN. In other words, for example, when the roaming user 104 is within the visiting network 112, conventional roaming scenarios often include a requirement that a service request by the roaming user 104 should be implemented at the home network 108. For example, in conventional scenarios, if the roaming user 104 requests a particular webpage, and assuming that the roaming user 104 has previously been authenticated and authorized, the request is often routed back to the home network 108 for connection to the internet and retrieval of the webpage in question using network resources of the home network 108. Such processes are often inefficient, and, through the use of the roaming mediator 102, the roaming user 104 may easily be authorized to directly utilize network resources of the mobile service provider 110 within the visiting network 112, and the mobile service provider 110 may simply track services provided to the roaming user 104, and thereafter may invoice the mobile service provider 106 based on actual types and quantities and data services provided to the roaming user 104 (e.g., as described in more detail below, may utilize a description of use by an application function of the visited network 112). From a business point of view, such use cases are relevant, because, for example, the visiting network is made aware of services accessed by roamers such as the roamer 104, thereby enabling the operator of the visited network 112 to charge the home network based on a use of provided services, rather than just on, e.g., access to these services.

The purpose of the Rx protocol is, for example, to exchange service session information between the PCRF in the home network and the AF in the visited network. In such scenarios, a first PCRF acts as a Diameter server in the sense that is a network element that handles AF authorization requests. Meanwhile, the AF behind the other PCRF acts as the Diameter client, in the sense that is a network element requesting an authorization of resources for an AF session.

In the example of FIG. 3, an S9 mediation function 324 is illustrated as a specific example of the roaming mediator 102 of FIG. 1, and the context of Diameter traffic over the S9 reference point, as already described above with respect to FIG. 3. As referenced there, for example, such use of Diameter traffic over the S9 reference point may be used to support availability of local breakout sessions for the roaming user 104, in which the roaming user 104 connects to the internet directly through the VPLMN, i.e., the visited network, rather than through the HPLMN, i.e., the home network. Further, the use of Diameter traffic over the S9 reference point may be used to support the availability of voice over LTE (VoLTE) to roaming users. For example, such roaming users may register on the IMS platform of the visited network, and thereafter access the voice service through the AF in the visiting network, rather than through the AF in the home network.

As may be appreciated from the discussion, it should be anticipated that implementations of the S9 and Rx Diameter protocols on the S9 reference point may be inconsistent from one mobile service provider to the next. Further, similar inconsistencies may be experienced with respect to the underlying 3GPP standards. As described, the S9 mediation function 324 may thus provide a hub-based mediation function for the S9 and Rx Diameter protocols over the S9 reference point.

In the example of FIG. 3, it should be appreciated that, as referenced above, in contrary to the use of the Diameter protocol across the S6 reference point, the use of the Diameter protocol across the S9 reference point is session-based (with sessions potentially carrying sub-sessions), adding significantly to complexities of inter-operability between different service provider implementations. The S9 mediation function 324 is configured to overcome these differences, and ensure error-free completion of sessions and sub-sessions.

As also referenced above, in order to achieve capability, the S9 mediation function 324 may be placed in conjunction with the DRA 305 as part of a service hub within the IPX domain 304. In another example, as illustrated in FIG. 4, some mobile service providers 402, 406 may refer to route S9 and Rx protocol traffic separately from S6 Diameter traffic. Thus, in the example of FIG. 4, the S9 mediation function 416 of FIG. 4 may be placed directly between the PCRF function 410, 414, while utilizing corresponding DEA modules 408, 412 to communicate over the IPX domain 404. Thus, FIG. 3 illustrates a scenario in which all Diameter traffic (including S6 and S9 reference point traffic) is routed along the same route through the IPX domain 304, while the example of FIG. 4 illustrates a scenario in which traffic for the S9 reference point is routed separately from the traffic for the S6 reference point, using a dedicated route.

Figure 4:
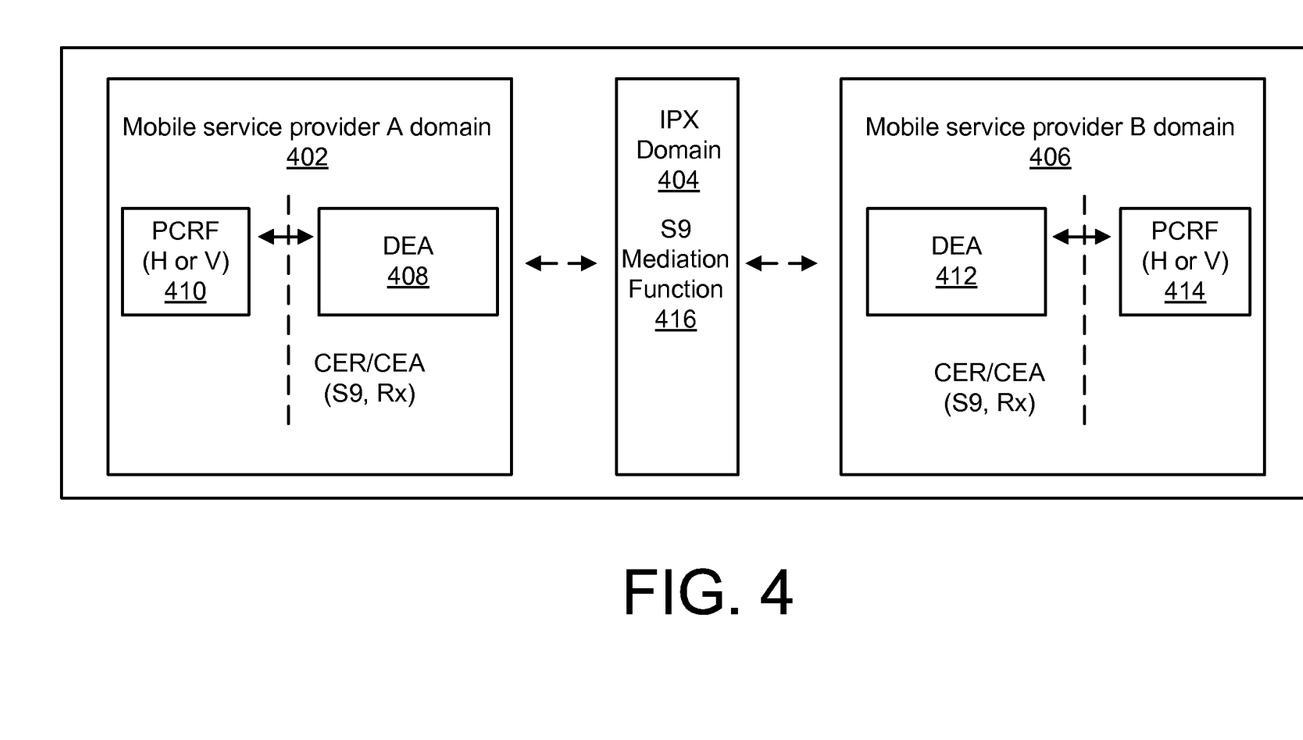
FIG. 4 is a block diagram of a second example implementation of the system of FIG. 1
Figure 5:
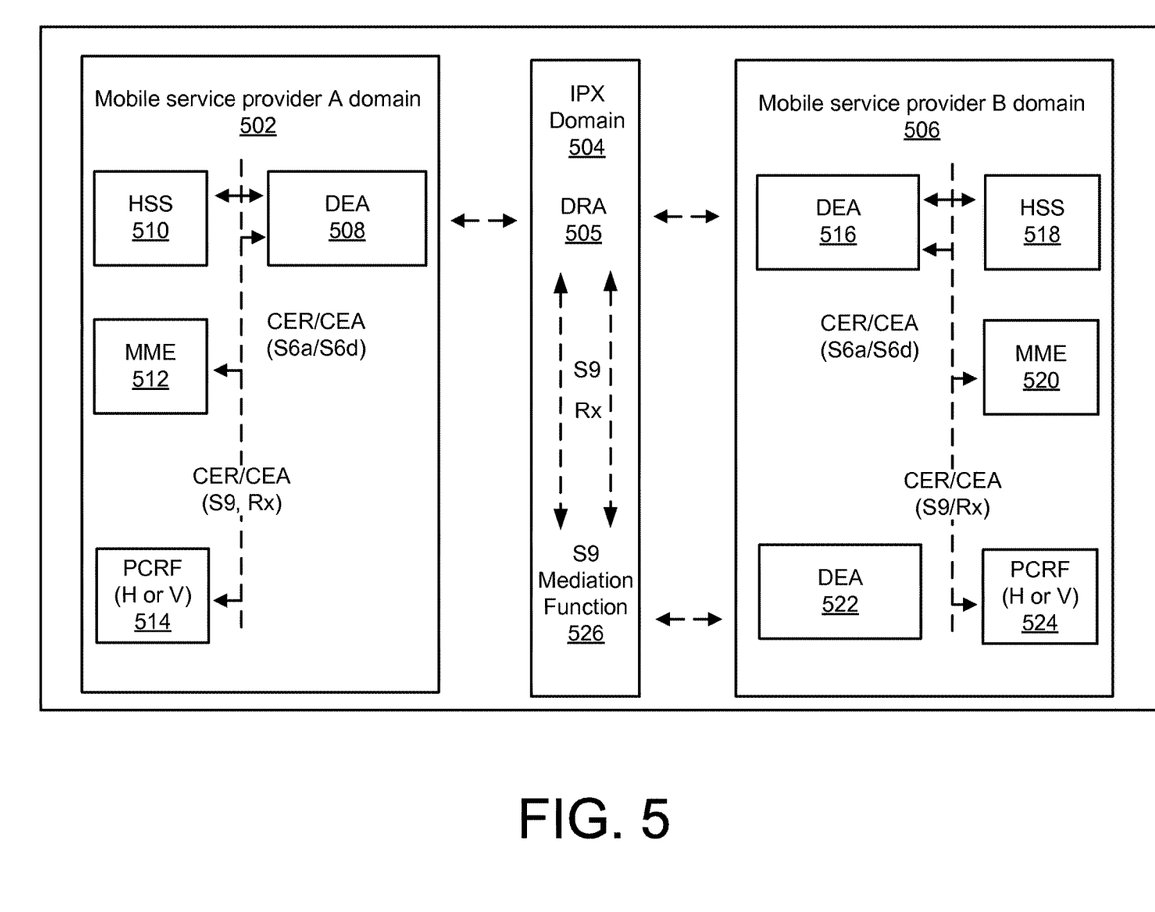
FIG. 5 is a block diagram of a third example implementation of the system of FIG. 1, representing a combination of the implementations of FIGS. 3 and 4.

FIG. 5 illustrates a combination of the implementations of FIGS. 3 and 4. As shown, a mobile service provider 502 interacts with the IPX domain 504 to communicate with a mobile service provide 506. As previously shown, a DEA 508, HSS 510, and in the 512, and PCRF 514 are included in the domain of the mobile service provider 502. Similarly, a DEA 516, HSS 518, and MME 520, and DEA 522, PCRF 524 are included within the domain of the mobile service provider 506. In the example, as shown, a DRA 505 allows the mobile service provider 502 to route all Diameter traffic across the same route, while mobile service provider B routes Diameter traffic for the S9 reference point via a dedicated route, using the DEA 522, and the S9 mediation function 526.

Regardless of the implementation chosen between the examples of FIGS. 3-5, the described S9 mediation function enables resolution of differences between roaming protocol implementations of the various mobile service providers. Moreover, in so doing, the S9 mediation function does not disrupt the speed or reliability of the high volume of Diameter traffic being routed over the S6 reference point.

As may be appreciated from the above description of FIGS. 3-5, the S9 mediation function may include at least two components. Specifically, a first mediation function for the S9 protocol and a second mediation function for the Rx protocol. In each case, the Diameter server may be implemented as a PCRF in home network, while the Diameter client or the S9 protocol would be the VPCRF and the Diameter client for the Rx protocol would be the AF in the visiting network.

The purpose of each of these mediation functions, as described, is to modify Diameter packets, so that a Diameter server can successfully set up and complete sessions (and sub-sessions) with the Diameter client. For example, each mediation function may be configured such that modifications for that Diameter session can be configured and stored specifically for each Diameter client/server pair. Such configuration techniques may enable through the use of an appropriate graphical user interface (GUI), as referenced above and described below with respect to FIG. 6.

Specifically, as shown in FIG. 6, a GUI 602 may be utilized to configure a mediation function 606 for the S9 protocol, as well as a mediation function 608 for the Rx protocol. As shown, and as just referenced above, the mediation function 606 for the S9 protocol may be utilized to enable an S9 interface 610 for communicating with a Diameter S9 server 612. Meanwhile, a S9 interface 614 may allow interaction with a Diameter S9 client 616, while, similarly, an S9 interface 618 may be utilized to communicate with another Diameter S9 client 620.

Similarly for the mediation function 608 of the Rx protocol, and Rx interface 622 may be utilized to communicate with a Diameter Rx server 624. Meanwhile, an Rx interface 626 may be utilized to communicate with a Diameter Rx client 628, while an Rx interface 630 is utilized to communicate with the Diameter Rx client 632.

As shown, the various mediation functions and interfaces may be understood to represent the overall S9 reference point 604. In this regard, as is known in the industry but for purposes of disambiguating terminology in the present description, it may be observed that the S9 reference point 604 refers to the network path component over which the various types of Diameter traffic travel, including the S9 protocol traffic and the Rx protocol traffic. That is, the term S9 can refer both to the S9 reference point on which multiple types of Diameter traffic travel, as well as to the S9 protocol, which is itself an example of such Diameter traffic that may travel in the S9 reference point 604.

As also described, the S9 Diameter traffic mediated by the mediation function 606 may be utilized to install QOS and PCC rules from an HSS of the home network onto an MME of a visited network. Meanwhile, the Rx protocol traffic traveling on the S9 reference point may utilize the mediation function 608 to allow the roaming user 104 to have authorized access to the various application function 136 of an underlying IMS platform 134 of a mobile service provider 110 in a visited network 112, as already described above with respect to FIG. 1.

Figure 7:
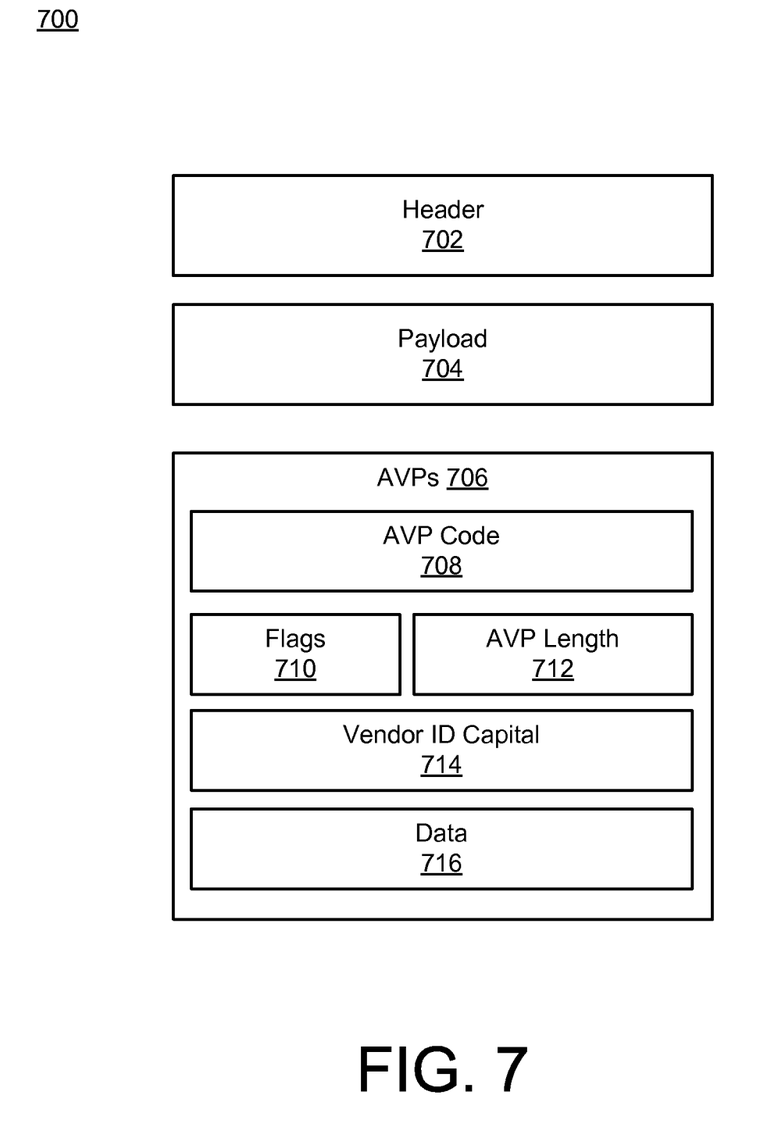
FIG. 7 is an example of a simplified, example Diameter packet.

FIG. 7 is an example Diameter packet 700, representing a simplified version of actual Diameter packets that may be transmitted using the systems and methods of FIGS. 1-5, including the various mediation techniques described with respect thereto. It will be appreciated that the Diameter packet 700 is a highly simplified and abbreviated example of actual Diameter packets, included merely for illustration and example in explaining various specific use cases and implementations of the systems and methods of FIGS. 1-5.

In the example of FIG. 7, a header 702 is shown in conjunction with a payload 704. As further shown, the payload 704 includes a number of attribute value pairs (AVPS) 706. That is, as well-known, Diameter packets typically include a payload in which a number of potential attributes are included (or not included), along with associated values for each included attribute.

As shown, and as is well-known, each AVP 706 has a frame format including an ABP code for identifying an included attribute, perhaps in conjunction with a vendor identifier (ID) 714. An AVP flag 710 may be used to provide information to a receiver regarding handling of the attribute in question. An AVP link provides a quantity of data used by the various fields of the AVBP in question; finally, the data 716 contains information (e.g., values) for the AVP in question.

The basic structure and format of the example Diameter packet 700 of FIG. 7 may thus be utilized to better understand the following use case examples of the S9 mediation function of FIGS. 3-5. Specifically, for example, in a first scenario, the S9 mediation function may be utilized to make basic correction to a Diameter packet such as the Diameter packet 700. Specifically, for example, when establishing an interconnection between two mobile service providers, it may be necessary to correct some basic information in one or more AVPs sent by one or both of the mobile service providers.

For example, the AVP 3GPP-MS-time zone is used in the Rx protocol to indicate an offset between universal time and a local time zone, taking into account daylight savings time. Where such time settings require correction in order to guarantee the correct performance of provided services for roaming users, the associated Rx protocol traffic may be routed through the corresponding mediation function, which can then perform the required correction.

In a second example use case, a specific implementation of the Diameter-based protocol may be aligned with a specification of a 3GPP application. Specifically, it may occur that an equipment vendor may deviate from 3GPP specifications of the Diameter-based protocol, such as when functions using the Diameter protocol only need to communicate with functions provided by the same vendor or other mobile service provider (which may commonly occur within the context of a single mobile service provider domain). However, in the case of LTE service running between multiple mobile service providers, compliance with the 3GPP standards may be required, so that relevant equipment and functions provided by the different mobile service providers are capable of interacting.

By way of more specific example, where the format of the AVP data field is a typed unsigned 32, the AVP link field would normally be set to 12. However, for 3GPP applications of the Diameter-based protocol, the vendor ID field 714 is used (with 3GPP code 10415), and the vendor ID bit is set. With the vendor ID bit set, however, the AVP link field 712 is required to be set to 16.

In this example, rather than forcing a mobile service provider to accommodate such a change, the Diameter traffic may be routed through the S9 mediation function. The S9 mediation function within insert the 3GPP vendor ID and the AVP (or remove the 3GPP vendor ID from the ABP for traffic moving in the opposite direction). The S9 mediation function may further set the vendor ID bit and the AVP accordingly, and correct the value in the AVP link field 712. Thus, by making these and other potentially necessary corrections for Diameter S9 messages received from the service provider in question, and for making converse alterations in the reverse direction, the S9 mediation function may quickly and reliably enable and enhance communications between the two mobile service providers in question.

In the final example of use case scenarios for modifying the Diameter packet 700 of FIG. 7, it may be necessary to manage information within the Diameter packet 700 that is specific to an individual mobile service provider. For example, through the AVP AF-application-identifier of type octetstring, not specifically illustrated in the simplified example of FIG. 7. The Rx protocol may exchange information pertaining to an AF service session. For example, the Rx protocol may be used to enable identification of the service to which the AF service session belongs, which, in turn, enables the differentiation of quality of service levels by the relevant HPCRF.

For example, the AVP data field type octetstring may typically contain arbitrary data of variable links. In order to ensure proper interpretation by the HPCRF of application identifiers sent by the AF of the visited network through this AVP, the F9 mediation function may modify this field and all received AVPs, as required by the receiving service provider.

Figure 8:
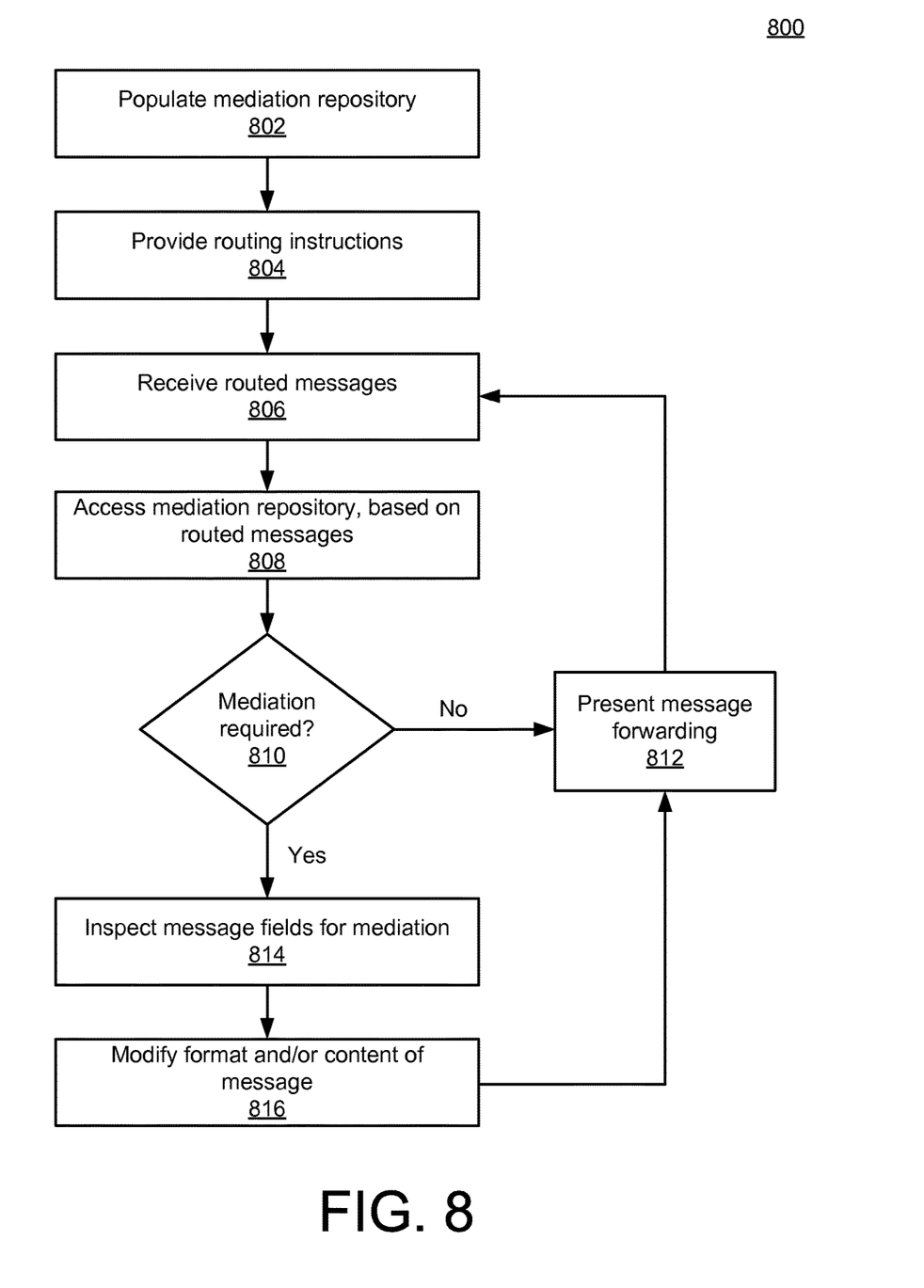
FIG. 8 is a flowchart illustrating a more detailed example implementation of the system of FIG. 1.

FIG. 8 is a flowchart 800 illustrating more detailed example implementations of the systems of FIGS. 1-6 in modifying Diameter packets represented by the simplified Diameter packet of FIG. 7. In the example of FIG. 8, the mediation repository 144 may initially be populated (802). For example, as described, the mediation repository may be utilized to store pairs of various mobile service providers, or, more specifically, pairs of Diameter client/servers. As described, such configuration may occur through the use of the GUI 602 of FIG. 6.

Routing instructions may be provided (804) to a service hub and associated routing agent, such as the service head 114 and the DRA 114 of FIG. 1. That is, as described, the routing instructor 138 may instruct the DRA 116 with respect to which Diameter packets received from all the various mobile service providers should be routed to the roaming mediator 102.

For example, it will be appreciated that the roaming mediator 102 may be provided as a service to mobile service providers who wish to benefit therefrom. Consequently, it may occur that, for a given service hub such as the service hub 114, a number of mobile service providers may utilize the service hub 114 and the DRA 116, while only a subset of the mobile service providers choose to pay for the service provider by the roaming mediator 102. Consequently, of course, only Diameter packets belonging to subscribing mobile service providers would be routed from the DRA to the message handler 140 of the roaming mediator 102. More generally, even in scenarios in which mobile service providers have subscribed to the roaming mediator 102, it may occur that only certain types of Diameter packets have been identified by the routing instructions as requiring mediation so that, again, the message handler 140 will receive only those messages that may potentially require mediation.

Accordingly, routed messages from the DRA 116 may be received, e.g., at the message handler 140 (806). That is, as just referenced, the message handler 140 will generally receive, in example, only those Diameter packets that may potentially require some type of mediation.

Then, the mediation repository 144 may be accessed, based on the routed messages (808). For example, the packet inspector 146 may utilize the mediation repository 144 to determine which messages, if any, may require mediation (810).

If no mediation is required, then message forwarding by the DRA may be permitted (812). On the other hand, if mediation is required (810), then the individual packet fields may be inspected to determine what specific types of mediation may be required (814). Then, as shown, the format and/or content of the packet may be modified by the packet modifier 148 (816), after which, again, message forwarding by the DRA 116 for the mediated message may be permitted (812).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one processor to:
   monitor a plurality of messages exchanged between pairs of a plurality of mobile service providers, the plurality of messages including a roaming message from a roaming user within a visited network of a visited mobile service provider of the plurality of mobile service providers, the roaming message sent in accordance with a first roaming protocol implementation of the visited mobile service provider;
   access a mediation repository storing relationships between pairs of roaming protocol implementations of corresponding pairs of mobile service providers, including mediation requirements for each pair;
   identify, from the mediation repository, a relationship, of the stored relationships, between the first roaming protocol implementation of the visited mobile service provider and a second roaming protocol implementation of a home mobile service provider of which the roaming user is a subscriber;
   determine, from the relationship, that the roaming message requires modifications in order to comply with the second roaming protocol implementation; and
   modify the roaming message to ensure compliance with the second roaming protocol implementation.

2. The computer program product of claim 1, wherein the instructions, when executed, are configured to cause the at least one processor to:
   receive the roaming message from a service hub configured to route inter-operator traffic between the pairs of the plurality of mobile service providers, including the home mobile service provider and the visited mobile service provider.

3. The computer program product of claim 1, wherein the instructions, when executed, are configured to cause the at least one processor to:
   establish a session between the visited mobile service provider and the home mobile service provider;
   provide an application function of the visited mobile service provider to the roaming user within the session; and
   provide a description of use of the application function by the roaming user to the home mobile service provider.

4. The computer program product of claim 3, wherein the first and second roaming protocol implementations define the session based on corresponding Internet Protocol (IP) packets to enable packet-switched providing of the application function.

5. The computer program product of claim 1, wherein at least one of the first roaming protocol implementation and the second roaming protocol implementation includes an implementation of the Diameter protocol.

6. The computer program product of claim 5, wherein the instructions, when executed, are configured to cause the at least one processor to:
   implement the S9 protocol on the S9 reference point to install Quality of Service and Policy and Charging Control Rules on a mobility management entity of the visited mobile service provider.

7. The computer program product of claim 5, wherein the instructions, when executed, are configured to cause the at least one processor to:
   implement the Rx protocol on the S9 reference point to exchange application-level session information between the Policy and Charging Rules Function (PCRF) of the home mobile service provider and the application function of the visited mobile service provider in the visited network.

8. The computer program product of claim 1, wherein the instructions, when executed, are configured to cause the at least one processor to:
   modify the roaming message including changing a format of data within a data packet of the message.

9. The computer program product of claim 1, wherein the instructions, when executed, are configured to cause the at least one processor to:
   modify the roaming message including defining an expected inclusion or omission of a field of the data packet, including a length and value of the field; and
   modifying the roaming message to conform with the expected inclusion or omission of the field.

10. The computer program product of claim 1, wherein the instructions, when executed, are configured to cause the at least one processor to:
    receive a second roaming message from the second mobile service provider, the second roaming message configured in accordance with the second routing implementation; and
    modify the second roaming message to ensure compliance with the first roaming protocol implementation.

11. A computer-implemented method for executing instructions stored on a non-transitory computer readable storage medium, the method comprising:
    monitoring a plurality of messages exchanged between pairs of a plurality of mobile service providers, the plurality of messages including a roaming message from a roaming user within a visited network of a visited mobile service provider of the plurality of mobile service providers, the roaming message sent in accordance with a first roaming protocol implementation of the visited mobile service provider;
    accessing a mediation repository storing relationships between pairs of roaming protocol implementations of corresponding pairs of mobile service providers, including mediation requirements for each pair;
    identifying, from the mediation repository, a relationship, of the stored relationship, between the first roaming protocol implementation of the visited mobile service provider and a second roaming protocol implementation of a home mobile service provider of which the roaming user is a subscriber;
    determining, from the relationship, that the roaming message requires modifications in order to comply with the second roaming protocol implementation; and
    modifying the roaming message to ensure compliance with the second roaming protocol implementation.

12. The method of claim 11, further comprising
    receiving the roaming message from a service hub configured to route inter-operator traffic between the pairs of the plurality of mobile service providers, including the home mobile service provider and the visited mobile service provider.

13. The method of claim 11, further comprising
establishing a session between the visited mobile service provider and the home mobile service provider;
providing an application function of the visited mobile service provider to the roaming user within the session; and
providing a description of use of the application function by the roaming user to the home mobile service provider.

14. The method of claim 11, further comprising
receiving a second roaming message from the second mobile service provider, the second roaming message configured in accordance with the second routing implementation; and
modifying the second roaming message to ensure compliance with the first roaming protocol implementation.

15. A system comprising:
at least one processor; and
instructions recorded on a non-transitory computer-readable medium, and executable by the at least one processor, the system including
a roaming mediator providing a subscription service to a plurality of mobile service providers, the roaming mediator including
a message handler configured to cause the at least one processor to monitor a plurality of messages exchanged between pairs of the plurality of mobile service providers, the plurality of messages including a roaming message from a roaming user within a visited network of a visited mobile service provider of the plurality of mobile service providers, the roaming message sent in accordance with a first roaming protocol implementation of the visited mobile service provider, and further configured to cause the at least one processor to access a mediation repository storing relationships between pairs of roaming protocol implementations of corresponding pairs of mobile service providers, including mediation requirements for each pair and identify, from the mediation repository, a relationship between the first roaming protocol implementation of the visited mobile service provider and a second roaming protocol implementation of a home mobile service provider of which the roaming user is a subscriber;
a packet inspector configured to cause the at least one processor to determine, from the relationship, that the roaming message requires modifications in order to comply with the second roaming protocol implementation; and
a packet modifier configured to cause the at least one processor to modify the roaming message to ensure compliance with the second roaming protocol implementation.

16. The system of claim 15, further comprising
a routing instructor configured to cause the at least one processor to instruct the service hub to route messages from the inter-operator traffic to the message handler, based on the mediation repository.

17. The system of claim 15, further comprising
a view generator configured to cause the at least one processor to provide a graphical user interface (GUI) for configuring the message handler, the packet inspector and the packet modifier.

18. The system of claim 15, wherein at least one of the first roaming protocol implementation and the second roaming protocol implementation includes an implementation of the Diameter protocol.

\* \* \* \* \*